United States Patent [19]
Clarke et al.

[11] 4,175,106
[45] Nov. 20, 1979

[54] POST PRESS MOLDING OF MAN-MADE BOARDS TO PRODUCE CONTOURED FURNITURE PARTS

[75] Inventors: John T. Clarke, St. Charles; Allan J. Luck, Marengo; Roger F. Sutton, St. Charles, all of Ill.

[73] Assignee: Masonite Corporation, Chicago, Ill.

[21] Appl. No.: 833,037

[22] Filed: Sep. 14, 1977

[51] Int. Cl.² ............................................. B29J 5/00
[52] U.S. Cl. .................................. 264/118; 264/119; 264/120; 264/320
[58] Field of Search ............... 264/119, 120, 320, 118

[56] References Cited
U.S. PATENT DOCUMENTS 3,268,642  8/1966  Hutter ................................ 264/120
4,007,076  2/1977  Clarke et al. ........................ 156/62.2

Primary Examiner—Robert F. White
Assistant Examiner—James R. Hall
Attorney, Agent, or Firm—Mason, Kolehmainen, Rathburn & Wyss

[57] ABSTRACT

Six-sided furniture parts are manufactured by pressing a cellulosic fiber-containing mat to consolidate said mat into a unitary blank, cutting the blank to a size larger than interior dimensions of a closed mold in every dimension and with two to four generally shaped or profiled edges disposed between a top surface and a bottom surface of the blank. The cut blank is then molded at a temperature of at least 500° F. for a period of time sufficient to permanently transfer the interior shape and design of the mold cavity to every surface of the blank.

10 Claims, 5 Drawing Figures

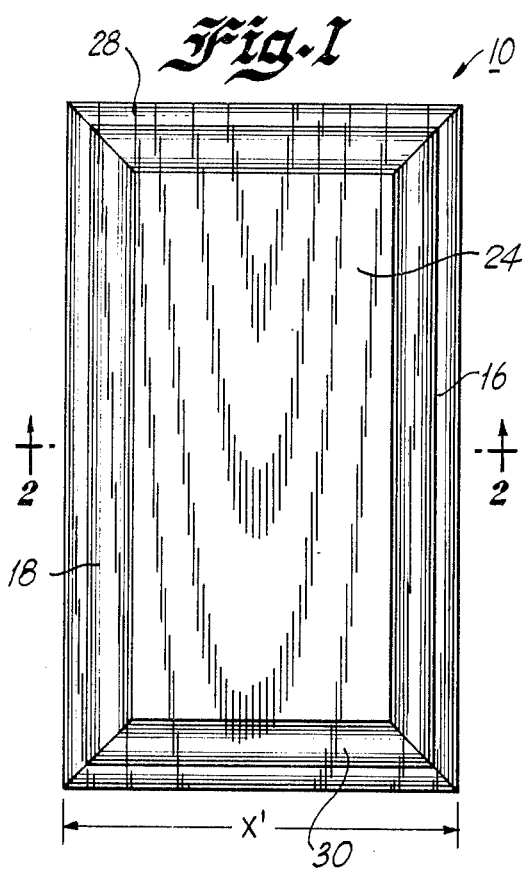
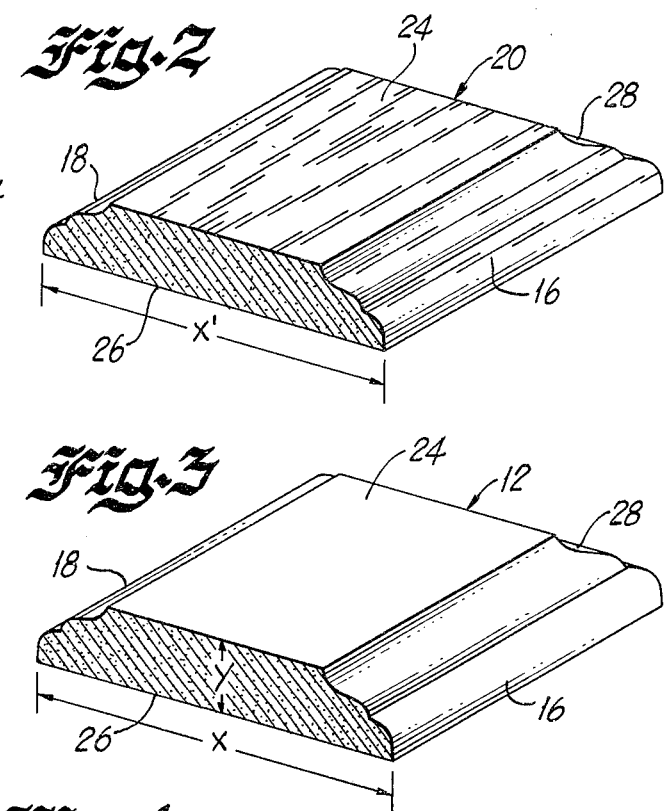
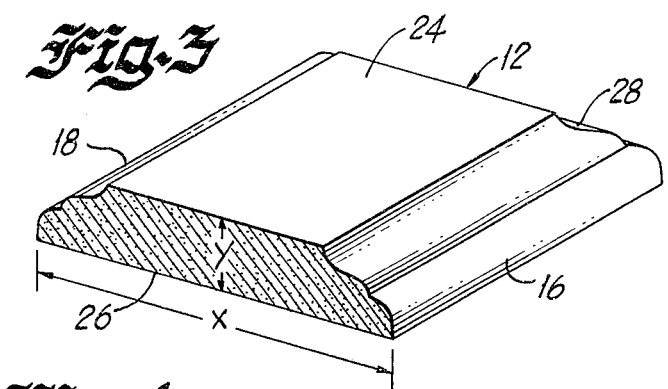
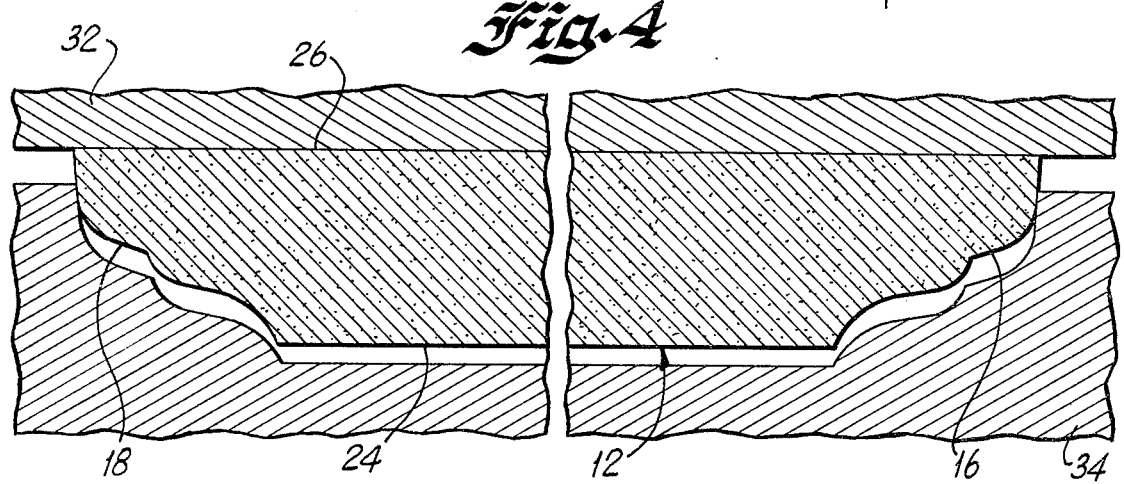
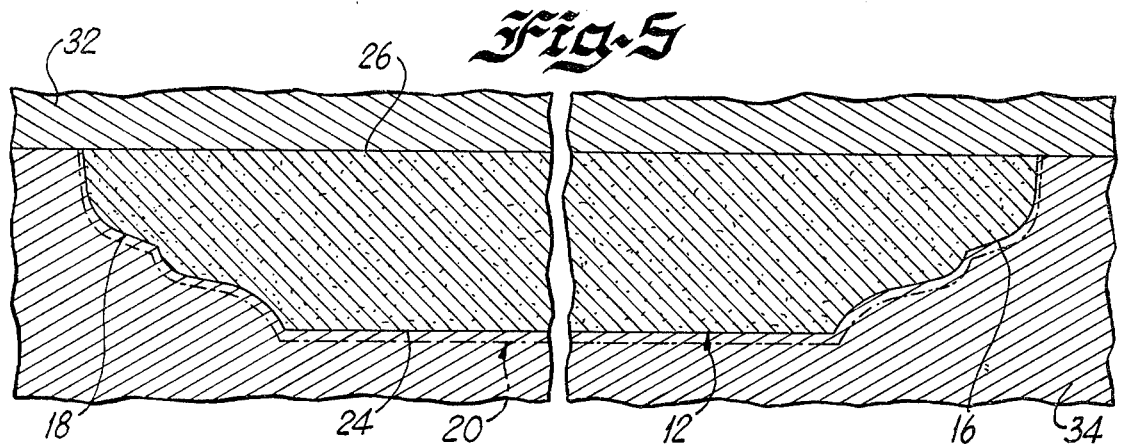

POST PRESS MOLDING OF MAN-MADE BOARDS TO PRODUCE CONTOURED FURNITURE PARTS

BACKGROUND OF THE INVENTION

1. Field of the Invention

The present invention relates to a method of molding man-made boards to produce six-sided contoured furniture parts. More particularly, the present invention relates to a method of molding a man-made board to produce a contoured furniture part, such as a drawer front, cabinet door, table top, and the like. A fiber-board or particle board blank is first formed and cut to a size slightly larger than interior dimension of a mold. The cut blank can be pre-treated with a sealer, preferably including a release agent, and is then molded at a temperature of at least 500° F. to form the blank into its final shape.

The process of the present invention relates to a "post-press" or second press molding operation for molding a fiberboard or particle board into a six-sided part having a desired shape. The fiberboard or particle board substrate is formed by depositing a mass of fibers onto a support member, by either a dry deposition process or wet deposition process known in the art of papermaking or fiberboard manufacture, and then consolidating the fibers under heat and pressure. Typical products made by these processes are medium density fiberboard and particle board.

After board consolidation, the blank is cut from the board to a size slightly larger than interior dimensions of a mold cavity. The consolidated cut blank is thereafter "post-press molded" in a mold having a desired internal configuration to mold the consolidated fiberboard blank into a six-sided part having a desired shape and to form a surface coloration and design corresponding to darkly stained natural wood or other natural materials, such as cork, slate and the like. For the purpose of the present invention, a "post-press molding" operation refers to a molding step performed on a consolidated man-made board which changes the dimensions of the consolidated board in all three of its dimensions.

It is necessary to form the furniture part of the present invention in two separate operations. The first operation forms a consolidated man-made board, in a manner common in the art of forming a fiberboard, such as medium density hardboard. The second step comprises "post-press molding" which changes the overall dimensions of the consolidated fiberboard along its length, width and height to form a six-sided contoured board having dimensions corresponding to the dimensions of the mold cavity. It is quite surprising that a "post-press molding" operation is effective in substantially altering the dimensions of a consolidated fiberboard in all three dimensions to produce a six-sided embossed part without visible fiber tearing or delamination.

2. Description of the Prior Art

It is very difficult to both densify and restructure the surface of a consolidated fiberboard without destroying the fiber-to-fiber surface welds referred to in this assignee's U.S. Pat. No. 4,007,076 and co-pending application Ser. No. 739,184 filed Nov. 5, 1976.

An article entitled "Wood Embossing Machines Cut Production Steps For 'Carved' Parts" by Bruce Scully, appearing in Furniture Design & Manufacturing, February, 1977, pages 30-33 and an article entitled "Two New Consepts in Embossing" by Darrell Ward, appearing in Woodworking & Furniture Digest, June, 1977, pages 46-50, relate to embossing materials, including fiberboard, in making furniture parts, but do not suggest molding a man-made board to produce six-sided parts as disclosed herein.

SUMMARY OF THE INVENTION

An object of the present invention is to provide six-sided furniture parts made from man-made boards having the look, feel and sound of natural wood.

Another object of the present invention is to provide a cellulosic fiber-containing molded furniture part or decorative molding having the look, feel, texture and color of stained natural wood or other natural materials by compressing a consolidated man-made board in all three of its dimensions in a mold at a temperature of at least 500° F.

Another object of the present invention is to provide a man-made molded board having design fidelity and paint holdout properties equal to or better than hardboards and natural wood parts manufactured in accordance with existing technology.

Another object of the present invention is to provide a method of molding consolidated man-made board blanks having a density greater than 35 pounds/cubic foot.

In accordance with an important feature of the present invention, the technology disclosed herein has been developed to provide a strong cellulosic fibercontaining molded product, for example, molded fiberboard which has sufficient strength for end uses such as furniture parts and decorative moldings. The high strength product is produced by first manufacturing and consolidating a fiberboard blank, then cutting the blank to a size slightly larger than interior dimensions of a mold cavity; thereafter, the consolidated, oversized blank is molded to size and shape.

In accordance with the present invention, it has been found that the configuration, surface density, and physical characteristics of a completely consolidated fiberboard or particle board blank can be altered in a "post-press molding" operation when the mold is heated to a temperature of at least 500° F. During the "post-press molding" operation, at a temperature of at least 500° F., a consolidated cellulosic fiberboard or particle board substrate is strengthened in an amount necessary for the product to be useful as a furniture part while, at the same time, the board is restructured in all three of its dimensions to a desired configuration. The resulting product has a look, feel, sound and can have a density equivalent to that of natural wood, while being produced at a much lower cost.

To manufacture furniture parts from man-made boards, it has been found necessary to provide a premolded blank which is oversized in each of its three dimensions. In this manner, sufficient pressure will be imparted to all surfaces of the blank, during molding, to provide enough heat transfer from the mold to the blank to effect accurate reproduction of the details of the mold cavity into all surfaces of the molded product. It may not be necessary to emboss or finish (stain) one or two sides of the product because of the positioning of a particular furniture part with respect to other parts or with respect to surrounding walls, such as with shelving material. It is always necessary, however, for the blank to be oversized in all three of its dimensions to provide design fidelity and paint holdout properties to the remaining sides. Accordingly, while the product of the present invention may be finished on only four or five of its six sides, it is always necessary to compress the pre-mold blank in all of its three dimensions to provide a furniture part having an embossed design and excellent paint hold-out properties on all of its visible sides. "Design fidelity" or simply "fidelity" as used herein is a measure of the accuracy of reproduction of the design of an embossing mold onto the surfaces of a consolidated blank. "Paint holdout" is the ability of a panel to keep paint on its surface without a significant amount striking into the panel.

BRIEF DESCRIPTION OF THE DRAWINGS

FIG. 1 is an elevational view of the front of a furniture part manufactured in accordance with the present invention.

FIG. 2 is a cross-sectional, perspective view of a molded, shaped furniture part taken along the lines 2—2 of FIG. 1 molded from the blank of FIG. 3 in accordance with the present invention.

FIG. 3 is a cross-sectional, perspective view of an oversized, shaped, pre-mold blank which is molded, as shown in FIGS. 4 and 5 to produce the part shown in FIG. 2.

FIG. 4 is a cross-sectional view of the oversized blank as it is forced into the mold along tapered edges.

FIG. 5 is a cross-sectional view of the closed mold during molding of the blank of FIG. 3 and shows the premolded shape of the blank in broken lines.

DETAILED DESCRIPTION OF THE INVENTION

The man-made blank is manufactured in accordance with known technology in producing consolidated fiberboards or particle boards. Typical man-made boards useful for molding in accordance with the present invention have a density in the range of about 35 to about 60 pounds/cubic foot. A typical example is medium density fiberboard having a density of about 44 pounds/cubic foot. The fiberboard blank is consolidated under heat and pressure in a first press operation, as known in the art.

Prior to molding the consolidated blank to a desired shape and surface design, the blank is first cut or routed to a size and shape generally corresponding to the size and shape of a mold cavity, but slightly (up to about 3/32") larger in each of its three dimensions. In this manner, when the oversized blank is inserted into the mold cavity and the mold closed, pressure will be exerted on the blank along every side to compress the blank to a size corresponding to the size of the mold cavity. Oversizing the blank is necessary so that the mold embossing plates will exert enough pressure on the blank when the mold is closed for accurate transfer of the details of the interior surface of the mold cavity and for proper heat transfer to each blank surface wherein a surface design and/or surface coloration is desired.

To achieve the full advantage of the present invention, the blank is cut slightly larger than the finished part on all surfaces so that the finished part can be embossed within the mold on all sides. To achieve the full advantage of the present invention, the blank is shaped, such as by using a router or shaper, to about the same profile as the finished part to assure that about equal pressure is applied in the mold and to assure uniform heat transfer to the molded surfaces. For example, in making a drawer front such as that shown in the drawing, a medium density consolidated fiberboard having a density of 44 pounds/ft$^3$ was cut to form a blank having dimensions 15 1/16"×7 9/16"×0.0800". The dimensions of the mold cavity and final part were 15"×7½"×0.750".

The size of the blank is somewhat dependent upon the density of the blank—the lower the blank density, the greater can be the oversizing of the blank. A blank having a density approaching 35 pounds/ft$^3$ can be cut to about 15% oversize along its thickness dimension, and oversized to the mold length and width by about 1/16".

A mold lubricant or sealer can be applied to the surfaces of the blank prior to molding. The sealer aids in hardening the molded surfaces, increasing paint hold-out, and can include a releasing agent such as polydimethylsiloxane to aid in removing the finished part from the mold. Typical mold lubricants are, for example, acrylic polymers, such as Lilly Prepress Sealer 73-035, and the like. Any lubricant, sealer or releasing agent can be applied to the oversized blank prior to molding so long as the additive can withstand the high molding temperature.

MOLDING CONDITIONS

A consolidated blank is "molded" at a temperature of at least 500° F. To achieve the full advantage of the present invention, the temperature of "molding" should not exceed 650° F. It is preferred to mold at a temperature in the range of 525°–575° F. As shown in the drawing, a molded contoured drawer front, indicated generally by reference numeral 10 is molded from a consolidated blank 12. The consolidated blank 12 is pre-shaped, as indicated generally in FIG. 3.

Each blank must be larger than the dimensions of the mold cavity in each of its three dimensions to provide accurate transfer of the details of the mold and excellent paint holdout to all surfaces of the blank 12. The blank 12 of FIG. 3 has been shaped by routing along its opposing side edges 16 and 18 to provide a width (x-dimension) which is larger than the x' dimensions in the corresponding finished part 20 (FIG. 2).

Both of the major surfaces, top surface 24 and bottom surface 26, are oversized. It is important that all three dimensions of a three dimensional part are oversized prior to molding to achieve the compression and heat transfer necessary to impart embossing details and paint holdout properties to all surfaces. As shown in FIG. 4, a shaped blank 12 is molded by compressing top mold portion 32 onto bottom mold portion 34 to force blank 12 into the mold and to form the shape of the molded part to correspond to the dimensions of the mold cavity.

At least two, and preferably all four, of the side and end edges 16 and 18, 28 and 30 must be generally tapered, as shown in the drawing, from one major surface, i.e. 24, to the other major surface i.e. 26 so that during molding, the top mold portion 32 can close in contact with bottom mold portion 34, thereby forcing the oversized blank 12 into the mold cavity. One major surface, i.e. 24, therefore, must be smaller than the other major surface to allow for at least two generally tapered edges 16, 18, 28 and 30 so that the oversized blank 12 can be wedged into the mold cavity without tearing the fibers of the consolidated blank. It is quite surprising that a consolidated blank, oversized in all three dimensions, can be forced into a smaller mold cavity and thereby have its dimensions changed in every direction without surface fiber tearing. It has been found that a temperature of at least 500° F. and at least two generally tapered side or end edges are necessary to prevent surface fiber tearing during molding. With generally tapered edges and a mold temperature of at least 500° F., the blank can be oversized as much as 1/16-3/32" without surface fiber tearing, while obtaining sharp, crisp transference of the details of the mold cavity into all surfaces of the molded product.

The shaped blank is molded at a temperature of at least 500° F., and generally at a temperature in the range of 525°-575° F. An exact reproduction of the design of the mold cavity is imparted to the shaped blank on each oversized surface. An example of a typical molding cycle for small parts is as follows: the blank is loaded into the mold having a temperature of 550° F. in 4 seconds: the mold is brought up to 500 psi in 11 seconds and held at full temperature and pressure for 30 seconds; 10–15 seconds are required to relieve the pressure and 5 seconds are required to remove the finished part. In all, therefore, it requires one minute to mold a six-sided furniture part using the method of the present invention.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A method of molding a cellulosic fiber containing board to form a three dimensional contoured part comprising:
   (a) compressing and heating a fibrous mass of cellulosic fibers to bond the fibers into a consolidated blank;
   (b) cutting the consolidated blank to a shape having a plurality of generally tapered edges and corresponding generally to the interior shape of a closed, contoured mold cavity wherein said cut blank is slightly larger than the interior dimensions of said mold cavity in each of its three dimensions;
   (c) inserting said cut blank in the open cavity of said contoured mold;
   (d) closing said mold;
   (e) hot-pressing said consolidated, cut blank in said mold at a temperature of 500° F. to 650° F. to re-shape the blank in all three of its dimensions to form a contoured, molded product; and
   (f) opening said mold and removing said molded, contoured part.

2. A method as defined in claim 1 wherein step (e) is carried out at a temperature of 525°-575° F.

3. A method of forming a molded furniture part from a pre-formed cellulosic blank having a density greater than 35 pounds/ft.$^3$ to form a multisided contoured part, comprising:
   (a) cutting said pre-formed consolidated blank to a size slightly larger, in each of its three dimensions, than corresponding interior dimensions of a contoured closed mold cavity;
   (b) forming said consolidated blank with a plurality of generally tapered edges so that a portion of said blank will extend into said mold cavity, without force; and
   (c) inserting said cut blank into said mold;
   (d) closing said mold to cause said blank to conform to the contoured cavity of said mold and to reduce the size of said blank along all three dimensions, and to transfer details of said contoured mold cavity to the surface of said blank.
   (e) heating said closed mold to a temperature of 500° F.–650° F.; and
   (f) opening said mold and removing said contoured furniture part.

4. A method as defined in claim 3 wherein step (e) is carried out at a temperature of 525°-575° F.

5. A method of manufacturing a three dimensional, multi-sided part comprising:
   (a) pressing a cellulosic fiber-containing mat to consolidate said mat into a unitary blank having a density greater than 35 pounds/cubic foot;
   (b) cutting said blank to a size larger than interior dimensions of a closed mold in all three dimensions;
   (c) cutting the consolidated blank to form a plurality of generally tapered edges disposed between a top surface and a bottom surface of said blank;
   (d) inserting said cut blank into the open cavity of said contoured mold;
   (e) closing said mold;
   (f) hot pressing said unitary cut blank in said mold at a temperature of 500° F. to 650° F. for a period of time sufficient to permanently transfer the interior shape and design of the mold cavity to every surface of said blank and to re-shape said blank in all three dimensions; and
   (g) opening said mold to remove said three-dimensional, multi-sided part.

6. A method as defined in claim 5 wherein step (f) is carried out at a pressure not exceeding 750 p.s.i.

7. A method as defined in claim 5 wherein step (f) is carried out at a pressure of 30–700 p.s.i.

8. A method as defined in claim 7 wherein step (f) is carried out at a pressure of 100–500 p.s.i.

9. A method as defined in claim 5 wherein said mold includes a vent plate for the escape of gases formed in said mold.

10. The method of claim 1 wherein said three dimensional contoured part is a six-sided part.

* * * * *